Sept. 9, 1941.                C. W. WILSON                 2,255,341
        COMPOSITION OF CITRUS FRUIT CONSTITUENTS AND BORIC ACID
                    AND METHOD FOR MAKING THE SAME
                         Filed April 13, 1939
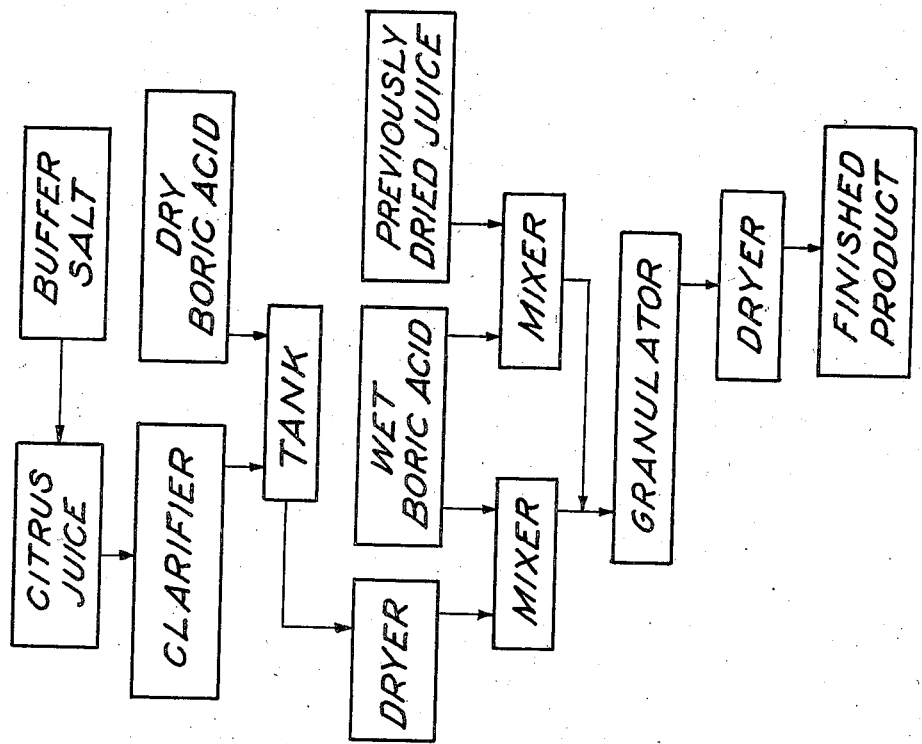
Fig. 2
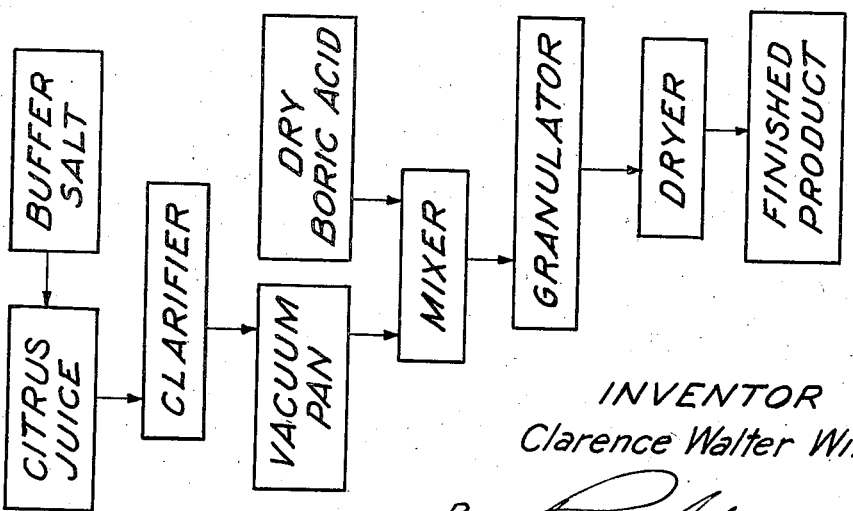
Fig. 1
INVENTOR
Clarence Walter Wilson
By
Attorney Patented Sept. 9, 1941

2,255,341

UNITED STATES PATENT OFFICE 2,255,341

COMPOSITION OF CITRUS FRUIT CONSTITUENTS AND BORIC ACID AND METHOD FOR MAKING THE SAME

Clarence Walter Wilson, Norco, Calif., assignor to California Fruit Growers Exchange, Los Angeles, Calif., a corporation of California Application April 13, 1939, Serial No. 267,704

8 Claims. (Cl. 167—85)

This invention relates to a new composition, preferably in a substantially dry form, of citrus fruit constituents and boric acid, and also to methods of producing this new composition.

Citrus juices have been known to be of use in a number of different ways. Lemon juice, in particular, has been used as a skin bleach for many years. It is also well known to the hairdressing art that lemon juice or lemon juice diluted with water makes an excellent hair rinse. Because of its ability to decompose soap curds formed during the shampooing of the hair in the presence of hard waters, and its ability to impart a soft luster to the hair leaving it pliable and full of life, lemon juice is widely used in dressing the hair, as well as for a variety of other uses, including cosmetic uses.

Ordinary lemon juice, when dried, is very hygroscopic and does not remain in a condition satisfactory for use since it readily combines with moisture from the air to form a sticky mass. Moreover, such products do not have a bright lemon yellow color, and they may assume with age an unattractive brownish color. Therefore, the many attempts to use ordinary powdered lemon juice for the above uses have proven very unsatisfactory.

I have discovered that by a certain treatment of citrus juices before, during, or after drying, hereafter disclosed in detail, it is possible to dry the juices satisfactorily without their exhibiting the undesirable characteristic of stickness when exposed to adverse conditions of temperature and/or humidity.

Further, I have discovered that by the addition of suitable substances a new and wholly unexpected and very desirable color effect is produced in dried lemon powder mixtures and that their beauty and usefulness are thereby enhanced. And still further, I have discovered that by adding "buffer," substances which stabilize the active hydrogen ion concentration or pH, a dried lemon powder mixture may be made which has an improved keeping quality.

The lemon juice which is employed in this new product and process may be either fresh or fermented lemon juice.

An object of this invention is to disclose and provide methods and means whereby substantially nonhygroscopic compositions of matter containing citrus juice may be produced.

Another object of this invention is to disclose and provide methods and means of treating lemon juice whereby a new composition of matter is obtained which submits readily to drying by various methods for drying juices.

Another object of this invention is to disclose and provide methods and means of treating fruit juice whereby a new composition of matter is obtained which submits readily to drying by various methods for drying juices.

A still further object of this invention is to disclose and provide methods and means of preparing a new composition of matter containing lemon juice in a powdered form which will not deteriorate appreciably as to color, odor, and general effectiveness when stored under normal conditions of temperature and humidity.

Another object of this invention is to disclose methods and means of treating lemon juice with a suitable drying aid and "buffer" whereby the keeping qualities of the new composition of matter are greatly enhanced.

A further object of this invention is to disclose methods and means of treating a new composition of matter, containing powdered citrus juice, by a method whereby a lemon yellow coloration is imparted to the finished product, said color adding greatly to the attractiveness and eye-appeal of the product.

A further object of this invention is to disclose methods and means of producing lemon powder, having a bright yellow color and stable at ordinary temperatures and humidities, by subjecting a mixture of boric acid and lemon juice powder to a moisture treatment.

A still further object of this invention is to disclose methods and means of preparing a new composition of matter consisting preferably of lemon juice, boric acid, and a buffer such as a salt of a strong base and a weak acid, and which may be dried by various methods.

Another object of this invention is to disclose methods and means of preparing a new composition of matter consisting of lemon juice, boric acid, and a buffer such as a salt of a strong base and a weak acid and which is suitable and useful as a hair rinse base.

All these and other objects, uses and adaptations of my invention will become apparent to those skilled in the art from the following detailed description which for purposes of illustration will be particularly directed toward the application of my invention to the drying of lemon juice. It will be further apparent that the following description by no means limits the type of juice for which this invention is adaptable. I refer here to citrus juices, generally, whether fresh, filtered juice and/or fermented juices, that is, for example, grapefruit juice, lime juice, etc.

Processes for practicing the invention are illustrated in the accompanying drawing, in which:

Figure 1 shows a flow sheet of one preferred process, and

Figure 2 shows a flow sheet of other preferred processes.

New compositions of matter which embody my invention may be prepared by any of the several methods and means disclosed hereinbelow.

In the process illustrated in the flow sheet comprising Figure 1, to a citrus juice, preferably lemon juice, there is added a suitable amount of borax. The borax is added for buffer. The amount of borax may be such as to bring the pH to about 3.5, which has been found to be a successful operating region. This juice may, if desired, be allowed to go through the clarifying step which is more fully discussed hereinbelow.

The juice is now concentrated, preferably under vacuum, to a solids concentration of about 65 to 75 per cent.

To the concentrated juice, dry boric acid is added, to form a dough. The amount of boric acid to be added may be calculated by combining the amounts indicated in paragraphs 3 and 7 of the summary given below for the processes illustrated by the flow sheet comprising Figure 2. Or, as a short cut to approximately equivalent results, the boric acid added may be such as to give in the final product about 20% citric acid by weight, calculated as anhydrous citric acid.

After thorough mixing the dough is forced through a screen of suitable mesh size, such as one having 10 or 14 meshes per inch, or is granulated in any other suitable way. It is then dried in any convenient way to get the finished product ready for packaging.

Alternative methods of procedure are illustrated by the flow sheet comprising Figure 2, and are discussed in full detail hereinafter.

A simple embodiment of my invention consists of mixing boric acid with dry powdered lemon juice as prepared in accordance with my U. S. Patent No. 1,975,998, issued October 9, 1934, for the art of Drying organic materials. In addition to the above, a salt of a strong base and a weak acid, as for example, borax, may be used as a buffering material, in which case it is preferably dissolved in the citrus juice, or, more particularly, the lemon juice. However, I find that my new product, when prepared from powder previously dried in accordance with the above patent, is relatively stable without additional buffer.

When prepared either with or without added buffer, from my previously dried powder, the resulting product will remain sensibly dry for a period of a few days, after which it loses its free-flowing property and becomes lumpy and hard. I have found that the reason for this phenomenon is that the product requires a certain amount of moisture or water as an inherent characteristic, and that this moisture is taken from the atmosphere with the result that the product cakes. I have discovered that this difficulty may be overcome by the addition to the mixture of a carefully controlled and comparatively small amount of water, preferably by mixing it with the boric acid before the same is combined with the dried lemon juice. This combination results in a noticeable rise in temperature of the mass, which is allowed to stand until the reaction is completed, as evidenced by a slight lowering in the temperature.

After the reaction is completed, stirring, screening, or other usual means to break up any lumps which may have formed is employed. The product is then dried at a slightly elevated temperature and then cooled at room temperature, whereby a product is obtained which remains free-flowing and non-hygroscopic for an almost indefinite period of time, even when stored under unfavorable conditions of temperature and/or humidity.

A further embodiment of my invention consists of adding boric acid to lemon juice and drying the resulting mixture, or of adding boric acid and a buffer, for instance, the salt of a strong base and a weak acid, such as, for example, borax, to lemon juice and then drying the mixture.

It is well known to those skilled in the art that for the successful commercial production of dried fruit juices generally, including dried lemon juice, it is necessary to make use of a drying promoter or drying aid.

The drying aid which I employ, namely, boric acid, is characterized by the fact that, when it is dissolved in the juice in amounts approximately equal to the solids of the juice, it imparts to the juice a characteristic which enables the juice to be readily dried by any common means. For example, by spray drying a mixture of either fresh and/or fermented lemon juice and boric acid a very satisfactory appearing product containing as high as 50% of juice solids, on the dry powder basis, is obtained. This product is free-flowing, and handles very readily. It is to be understood that boric acid will act as a drying aid in the drying of any of the fruit juices and that this action is not specific for citrus juices alone.

Here, as in the case with citrus juices, and especially lemon juice, the boric acid added should preferably be approximately the same in amount as the solids of the juice, on the dry powder basis, in order to obtain the best drying results.

In the case of lemon juice I have found that when it is dried in the unbuffered state with boric acid, the product obtained is comparatively unstable at higher storage temperatures and that it readily darkens, whereas if stored at relatively cool temperatures, such as around 50° F., it retains all its desirable characteristics for a period of about 6 months. Use of a buffer gives very great stability to the product.

In order that my invention may be perfectly clear as to a suitable manner for carrying out, I offer the following as an example.

*Example 1*

| | Parts |
|---|---|
| Lemon juice sufficient to contain juice solids | 600 |
| Boric acid | 640–1700 |
| Borax (or equivalent of other buffer salt) | 80– 250 |
| Water | 30– 190 |

The buffer salt is added to the lemon juice with stirring or by other means of agitation. For a buffer salt I have mentioned borax, although other salts of a strong base and a weak acid, for instance, sodium carbonate, have been successfully used. The mixture may be allowed to stand for a period of from several minutes to a few hours, preferably until any cloud present in the juice has coagulated. This coagulated cloud or slurry may be removed by any of various methods, such as centrifuging. The clarified juice is then mixed with a portion of the boric acid, approximately 250–450 parts of the total amount of 640–1700 parts. After thorough mixing the mixture is dried by known means. I prefer a spray drier for this purpose since the dried material resulting from such treatment is a finely divided, sensibly dry powder having a highly desirable color.

The remaining boric acid, as given in the tabulation, amounting to between 190 and 1450 parts, is carefully mixed by known means, with the water, which may vary from about 30 to about 190 parts, according to the amount of boric acid used. The moistened boric acid and the powdered lemon juice are then intimately mixed together. This mixture is allowed to stand until the reaction is complete, evidenced by the material losing its adhesiveness and by crumbling or falling apart when rubbed between the hands, and also by a slight lowering in temperature. Any large lumps may be broken down and the product granulated and/or sized by any of the various means for obtaining such a result, for example, screening. After being dried at a slightly elevated temperature and then cooled, the product is ready for packaging. As may be noted, the above examples show the art various way in which my invention may be carried out, and illustrate the general principles thereof.

In connection with the above mentioned embodiments, I have discovered a new and wholly unexpected advantage. The addition to the mixture of controlled amounts of water as suggested hereinabove results in the development of a definite lemon yellow color. My observations would indicate that there exists in citrus juices a component that forms this yellow color when the juices are treated with boric acid and moisture, as hereinbefore mentioned. This yellow color is greatly desired since it adds much to the attractiveness and salability of the product. And further I have found that the yellow color persists to a considerable extent when the finished product is diluted with water, the intensity of the color in such a solution depends, of course, on the degree of dilution, as well as the color of the lemon powder base.

The ability of citrus juice to form this color with boric acid is not destroyed by fermentation of the sugars in the juice. Neither is it removed by the removal of citric acid, as customarily practiced. However, decolorizing carbon seems to be able under some conditions to absorb the color-forming principle with a fair degree of completeness.

I have now discovered that the ability of citrus gruits and juices, particularly lemon, to produce the brilliant lemon yellow coloration with boric acid is due to the occurrence therein of certain flavone derivatives. In particular, the probable indicated configuration for the reactivity of these flavone derivatives is

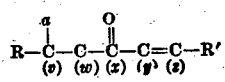

in which "a" is an auxochromic group which may probably be =O, OH, OCH₃, etc., and in which R, $C_v$ and $C_w$ may form a benzene ring, and $C_x$, $C_y$ and $C_z$ may form a portion of a pyran ring. R' is a benzene ring containing either methoxyl or hydroxy groups. It is to be noted, moreover, that hesperidin, in the form in which it is usually recovered from citrus fruits, is incapable of producing the coloration.

Another alternative for the manufacture of my product is the adding of borax and citric acid to the juice before spray drying, in which case some or all of the boric acid may be omitted.

However, the present and more specific embodiment of my method, in which I control factors which may be variables, is disclosed hereinbelow. As variables I refer to total acidity of the juice before adding the borax, pH of original juice after adding the borax and boric acid, and finally, the juice solids content of the finished product, calculated from an average figure for the citric acid content in juice.

The preparation of the product as illustrated in Figure 2 may be summed up in the following steps:

1. Determine the total solids, weight, and titrable acidity (as anhydrous citric) of the lemon juice to be used.

2. Add borax equal to 0.625 times the weight of the citric acid determined above, which should give the desired pH. Determine the pH, which will ordinarily lie between pH 3.4 and 3.6. This range is not absolutely essential to successful operation, but it does give good results. Therefore, if the pH lies substantially outside this range, I prefer to make suitable adjustment, as by means of citric acid or sodium bicarbonate. Another acid, or another salt, such as, for example, additional borax, may be used. Consideration should be given to the use for which the product is intended in making the choice of reagent here. Allow the juice to settle and then separate the slurry, as by centrifuging.

3. To obtain from this juice that has a constant pH, a feed mix having a constant acidity, which experience has shown may suitably be put at 34.5%, as citric acid, the following equation may be employed to determine the amount of boric acid required for any given mixture:

$$\frac{\text{Weight anhydrous citric acid} \times 100}{\text{Wt. total juice solids} + \text{wt. borax} \times 0.528 + \text{required boric acid}} = 34.5$$

Multiplying the weight of the borax by 0.528 converts it to the anhydrous basis. The equation simplifies to:

Weight boric acid required = 2.9 × weight anhydrous citric acid − weight total juice solids − 0.528 × weight borax added.

4. The feed mix is preferably heated to about 120° F. to assist in effecting solution of the boric acid.

5. The mixture is then dried. I prefer spray drying, although I do not wish to be understood as inferring that this is the only method that may be employed. Any suitable method may be used with satisfaction.

6. Place a suitable amount, say 100 pounds, of the spray dried powder in a mixer.

7. Moisten 78.6 pounds of granular boric acid with 1 quart of water and add to the above powder while agitating in the mixer. Mix until a harsh rattling of the granules indicates substantially complete combination of the water.

The granules are then sized to a suitable size, and may be dried in a current of warm air, for example, about 100–212° F.

The product may now be packaged.

In the specific embodiments outlined hereinbefore, the juice solids content of the finished product will vary from about 22% to about 44%.

This may vary over rather wide limits, running up to or even above 50%. Obviously only practical and economic considerations will set the lower limit. For example, a product containing only 1% of juice solids would contain my new composition of matter admixed with excess quantities of boric acid and/or borax, etc. But such a product seems to me at present to have relatively very small commercial possibilities.

It will be understood that many of the considerations explained above, and much of the detailed discussion, applies equally to the processes illustrated both in Figure 1 and in Figure 2. It is also to be understood that I regard my new product as containing, or consisting of, a new composition, or compositions, of matter. The new composition has a very distinctive lemon yellow color. Apparently only citrus fruits, of the more common fruits, possess the property of forming a yellow color when dried in the presence of boric acid, and only the lemon produces a brilliant color. Buffering gives a greatly increased stability, including stability of color, when applied to products prepared from the more acid fruits.

In addition to forming a new composition of matter with citrus juices, boric acid is capable of acting as a drying aid for juices, generally. For example, an excellent dried enzyme concentrate can be made from pineapple juice. Obviously all such products are not well adapted for use as food products.

In properly dilute solutions, my preferred products are well adapted for use as hair rinses, as well as for other external employment.

While I have described my invention in rather specific embodiments, it obviously is not limited thereto, but includes all those changes and modifications which readily suggest themselves to those skilled in the art.

This application is a continuation-in-part of my co-pending application Serial No. 188,807, filed February 4, 1938, which was co-pending with and a continuation of Serial No. 759,520, filed December 28, 1934.

Having thus fully described my invention and the manner in which the same is to be produced and used, I claim as my invention and desire to obtain by Letters Patent the following:

1. In a method of preparing a new composition of matter, the steps of mixing borax with lemon juice until the pH of the mixture lies between 3.4 and 3.6, allowing the juice to settle, separating the slurry, adding boric acid in approximately the amount as determined by the formula:

$2.9 \times$ wt. anhyd. cit. acid in juice—wt. total solids in juice—$0.528 \times$ wt. borax added drying the mixture, mixing in 78.6 parts of boric acid moistened with 2.1 parts water for every 100 parts of dried mixture, and drying in a current of warm air, whereby there is produced a dry, stable product having a brilliant lemon yellow color.

2. In a method of preparing a new composition of matter, the steps of mixing borax with lemon juice, allowing any cloud present to settle, removing the slurry, adding boric acid to the clarified juice, drying the mixture, adding boric acid moistened with water, then drying in a current of warm air, whereby there is produced a dry, stable product having a brilliant lemon yellow color.

3. The process of manufacturing the herein described new composition of matter comprising mixing boric acid in the presence of moisture with citrus juice solids containing flavone derivatives capable of producing a lemon yellow coloration with boric acid, and drying the mixture to produce a dry product having a lemon yellow color.

4. In a method of preparing a new composition of matter having a brilliant lemon yellow color, the steps of mixing a salt of a strong base and a weak acid, and boric acid with lemon juice, drying the mixture, adding thereto a quantity of boric acid moistened with water, and then drying in a current of warm air.

5. The process comprising intimately mixing a previously dried citrus juice with moistened boric acid, allowing to stand until the reaction is substantially completed, and drying the mixture, whereby there is produced a dry, stable, non-hygroscopic product having a brilliant lemon yellow color.

6. The process comprising intimately mixing a previously dried lemon juice with moistened boric acid, allowing to stand until the reaction is substantially completed, and drying the mixture, whereby there is produced a dry, stable, non-hygroscopic product, having a brilliant lemon yellow color.

7. A new composition of matter in substantially dry form comprising the reaction products of boric acid and citrus juice solids containing flavone derivatives capable of producing a lemon yellow coloration with boric acid, said products possessing a lemon yellow color.

8. A new composition of matter in substantially dry form comprising the reaction products of boric acid and lemon juice solids containing flavone derivatives capable of producing a lemon yellow coloration with boric acid, said products possessing a lemon yellow color.

CLARENCE WALTER WILSON.